(12) United States Patent
Li et al.

(10) Patent No.: US 11,537,000 B2
(45) Date of Patent: Dec. 27, 2022

(54) DISPLAY MODULE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fan Li, Beijing (CN); Dong Liu, Beijing (CN); Xiaolong Zhu, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/280,822

(22) PCT Filed: Jun. 24, 2020

(86) PCT No.: PCT/CN2020/097999
§ 371 (c)(1),
(2) Date: Mar. 26, 2021

(87) PCT Pub. No.: WO2021/258323
PCT Pub. Date: Dec. 30, 2021

(65) Prior Publication Data
US 2022/0197079 A1    Jun. 23, 2022

(51) Int. Cl.
*G02F 1/1335* (2006.01)
*G02F 1/1333* (2006.01)
(Continued)

(52) U.S. Cl.
CPC .. *G02F 1/133512* (2013.01); *G02F 1/133331* (2021.01); *H04M 1/0264* (2013.01); *H04N 5/2257* (2013.01)

(58) Field of Classification Search
CPC ............ H04N 5/2257; G02F 1/133314; G02F 1/133311; G02F 1/133512; G02F 1/133331
See application file for complete search history.

(56) References Cited

U.S. PATENT DOCUMENTS

| 8,825,124 B1 | 9/2014 | Davies et al. |
| 2015/0273786 A1 | 10/2015 | Ozeki |

(Continued)

FOREIGN PATENT DOCUMENTS

| CN | 203519978 U | 4/2014 |
| CN | 104951002 A | 9/2015 |

(Continued)

OTHER PUBLICATIONS

Chinese Office Action for Chinese Application No. HZR200413004, Search Report No. X190480087, dated Apr. 13, 2020, 8 Pages.

(Continued)

*Primary Examiner* — Jessica M Merlin
(74) *Attorney, Agent, or Firm* — Brooks Kushman P.C.

(57) ABSTRACT

The present disclosure provides a display module, including a display panel and a cover plate covering a light-exiting surface of the display panel. The cover plate includes a display panel setting region and a functional module setting region, a light shielding structure is connected to a side wall of the display panel close to the functional module setting region, the functional module setting region includes a light shielding region and a light transmitting region for exposing a functional module, the light shielding region surrounds the light transmitting region, and the light shielding region is provided with an alignment mark for the attachment of a protective film configured for covering the light transmitting region. The present disclosure further provides a display device.

12 Claims, 2 Drawing Sheets

(51) Int. Cl.
*H04M 1/02* (2006.01)
*H04N 5/225* (2006.01)

(56) References Cited

U.S. PATENT DOCUMENTS

| | | | |
|---|---|---|---|
| 2020/0064681 A1* | 2/2020 | Son | G06F 1/1686 |
| 2020/0117029 A1* | 4/2020 | Sung | H04M 1/0266 |
| 2021/0200020 A1* | 7/2021 | Kim | H01L 27/326 |

FOREIGN PATENT DOCUMENTS

| | | | |
|---|---|---|---|
| CN | 207258066 U | 4/2018 | |
| CN | 108881543 A | 11/2018 | |
| CN | 109031802 A | 12/2018 | |
| CN | 109445171 A | 3/2019 | |
| CN | 109597236 A | 4/2019 | |
| CN | 208922027 U | 5/2019 | |
| CN | 110673390 A | 1/2020 | |
| CN | 111128024 A | 5/2020 | |

OTHER PUBLICATIONS

PCT International Search Report and Written Opinion for Application No. PCT/CN2020/097999, dated Mar. 15, 2021, 9 Pages.
Chinese Office Action, English Translation.
PCT International Search Report and Written Opinion, Listing of Cited References in English Only.
CN203519978U, English Abstract and Machine Translation.
CN104951002A, English Abstract and U.S. Equivalent U.S. Pub. No. 2015/0273786 A1.
CN207258066U, English Abstract and Machine Translation.
CN108881543A, English Abstract and Machine Translation.
CN1090310802A, English Abstract and Machine Translation.
CN109445171A, English Abstract and Machine Translation.
CN109597236A, English Abstract and Machine Translation.
CN208922027U, English Abstract and Machine Translation.
CN110673390A, English Abstract and Machine Translation.
CN111128024A, English Abstract and Machine Translation.

* cited by examiner

DISPLAY MODULE AND DISPLAY DEVICE

CROSS-REFERENCE TO RELATED APPLICATION

This application is the U.S. national phase of PCT Application No. PCT/CN2020/097999 filed on Jun. 24, 2020, which is incorporated herein by reference in its entirety.

TECHNICAL FIELD

The present disclosure relates to the manufacture of a liquid crystal product, and in particular to a display module and a display device.

BACKGROUND

In recent years, with the rise of full-screen mobile phones, special-shaped display screens with a notch or an in-plane hole have gradually become a focus of public attention. A structure of a display module usually includes a cover plate and a display panel. The notch is provided at an edge of the display panel, and a functional component such as a camera or an infrared sensor is accommodated in the notch. However, there are the following defects.

Light leakage at a side of the display panel where the notch is formed may interfere with normal operation of the camera, the infrared sensor or the other functional components.

The cover plate includes a first region corresponding to the notch. The first region is provided with functional through holes corresponding to the functional component, including a camera hole and an infrared sensor hole. A protective film is attached to the first region to protect the above-mentioned functional through holes. However, usually the attachment accuracy and the alignment accuracy are demanded so as to ensure that the infrared (IR) sensor hole and the camera hole are covered by the protective film.

SUMMARY

An object of the present disclosure is to provide a display module and a display device, so as to prevent the occurrence of light leakage at the notch of the display panel and improve the attachment accuracy of the protective film.

In one aspect, the present disclosure provides in some embodiments a display module, including a display panel and a cover plate covering a light-exiting surface of the display panel. The cover plate includes a display panel setting region and a functional module setting region, a light shielding structure is connected to a side wall of the display panel close to the functional module setting region, the functional module setting region includes a light shielding region and a light transmitting region for exposing a functional module, the light shielding region surrounds the light transmitting region, and the light shielding region is provided with an alignment mark for the attachment of a protective film for covering the light transmitting region.

In a possible embodiment of the present disclosure, the light shielding structure is a light shielding adhesive.

In a possible embodiment of the present disclosure, a thickness of the light shielding adhesive in a direction perpendicular to the display panel is greater than or equal to a thickness of the display panel.

In a possible embodiment of the present disclosure, the functional module setting region is divided by the alignment mark into a light shielding adhesive setting region and a protective film attaching region, and the light shielding adhesive setting region surrounds the protective film attaching region.

In a possible embodiment of the present disclosure, the side wall of the display panel close to the functional module setting region includes a first side wall, a second side wall and a third side wall, the first side wall and the third side wall are arranged opposite to each other, the second side wall is connected between the first side wall and the third side wall, the alignment mark includes three alignment sub-marks alignment sub-mark corresponding to the first side wall, the second side wall and the third side wall respectively, and the three alignment sub-marks are spaced apart from each other.

In a possible embodiment of the present disclosure, the display panel includes an active display region and a non-display region, the light shielding region includes a first light shielding region extending toward the display panel, and an orthogonal projection of the first light shielding region onto the display panel covers the non-display region.

In a possible embodiment of the present disclosure, each alignment sub-mark includes a first edge close to a corresponding side wall of the display panel, the first light shielding region includes a second edge away from the first edge in a first direction, and a distance D between the first edge and the second edge is calculated through the following formulae: $c=\pm\sqrt{a^2+b^2+d^2}$, $D=A+B+C$, and $C \geq c$, where A is a length of a part of the first light shielding region overlapping the display panel in the first direction, B is a width of the light shielding structure in the first direction, C is a distance between the light shielding structure and a corresponding alignment sub-mark in the first direction, a is a tolerance of A, b is a tolerance of B, c is a tolerance of C, and d is a tolerance of D. The first direction is a direction from the alignment sub-mark to the corresponding side wall of the display panel.

In a possible embodiment of the present disclosure, the light shielding region is provided with a black ink layer.

In a possible embodiment of the present disclosure, the alignment mark is a colored ink layer in a first color, and the first color is a color other than black.

In another aspect, the present disclosure provides in some embodiments a display device including the above-mentioned display module.

The present disclosure has the following beneficial effects. Through the light shielding structure, it is able to prevent light leakage at the notches, and through the alignment mark, it is able to prevent an offset of attachment of the protective film and improve the attachment accuracy of the protective film.

DETAILED DESCRIPTION

Figure 1:
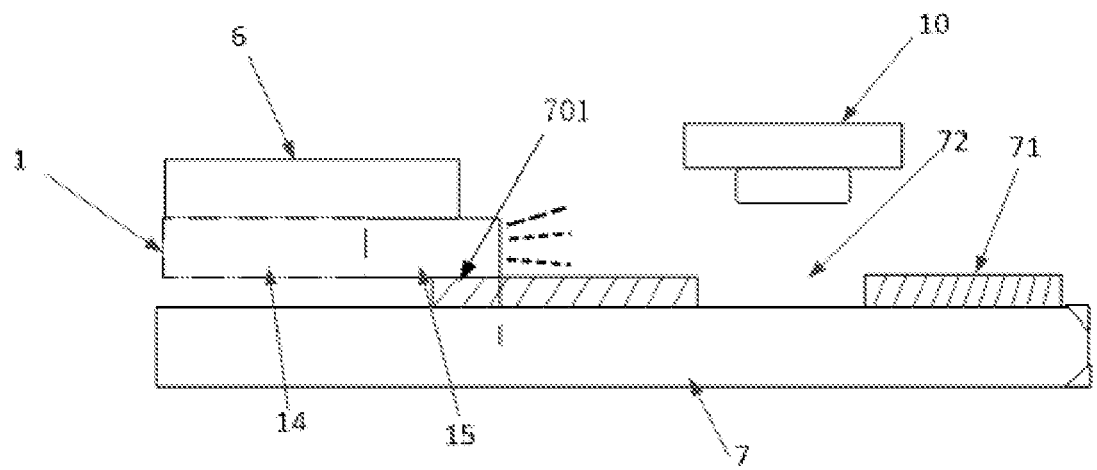
FIG. 1 is a schematic view showing a conventional display module.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

FIG. 1 shows a conventional display module. The display module includes a display panel 1 and a cover plate 7 covering the display panel 1. The cover plate 7 includes a display panel setting region and a functional module setting region, and the functional module may be a camera, an infrared sensor, etc. The functional module 10 is entirely accommodated in an electronic device including the display module. The functional module 10 is arranged in such a manner as to directly face a notch. In order to save space, the functional module 10 may be partially arranged in the functional module setting region and partially in a housing of the whole machine. A light shielding structure is connected to a side wall of the display panel 1 close to the functional module setting region. The functional module setting region includes a light transmitting region 72 and a light shielding region 71, and the light transmitting region 72 is configured to allow visible light to pass therethrough, so as to ensure the normal operation of the functional module 10. The light shielding region 71 surrounds the light transmitting region 72. However, due to the existence of the functional module setting region (which is arranged in such a manner as to directly face the notch formed when one end of the display panel is depressed inwardly), the light leakage may easily occur at the side wall of the display panel close to the functional module setting region and thereby interfere with the functional module 10. Moreover, in the related art, it is impossible to meet the attachment accuracy and alignment accuracy of a protective film.

Figure 2:
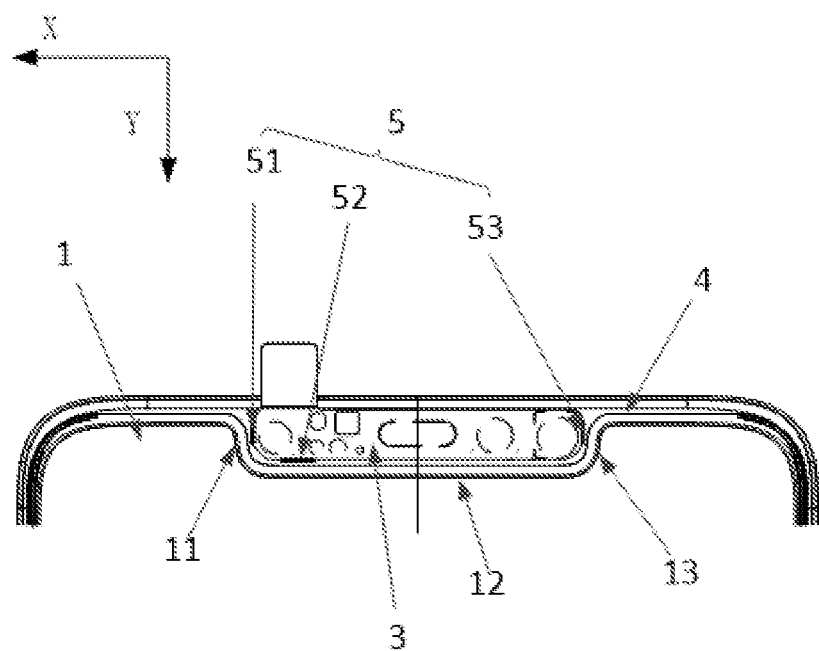
FIG. 2 is a schematic view showing a display module according to one embodiment of the present disclosure.
Figure 3:
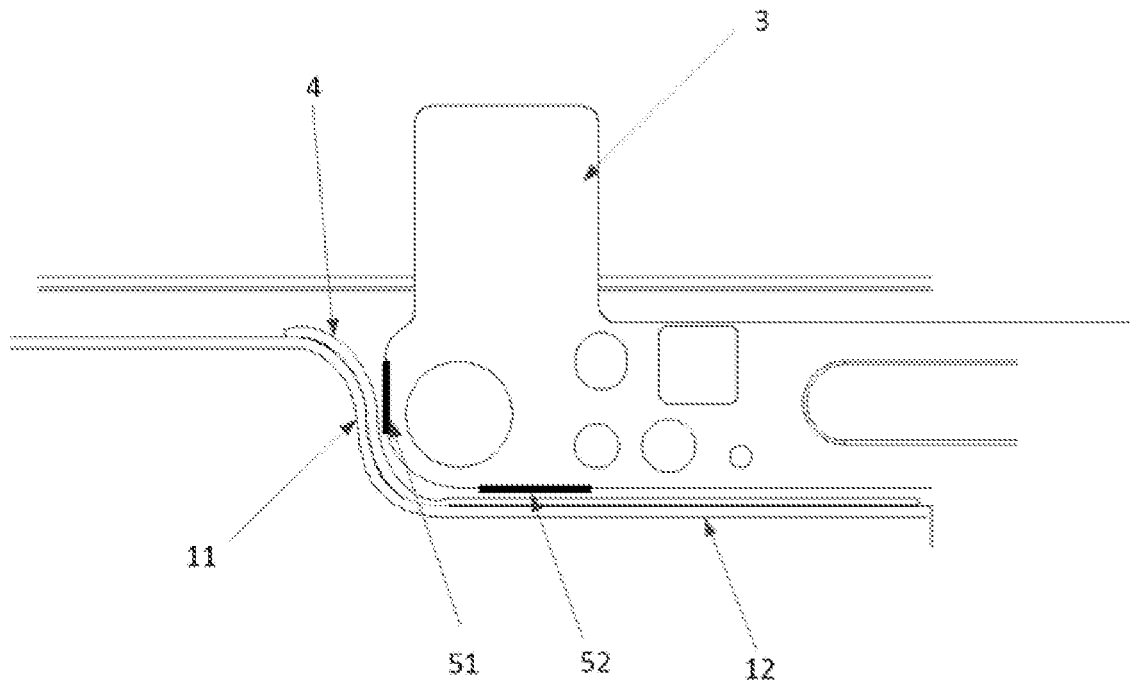
FIG. 3 is a partially enlarged view of a portion in FIG. 2.
Figure 4:
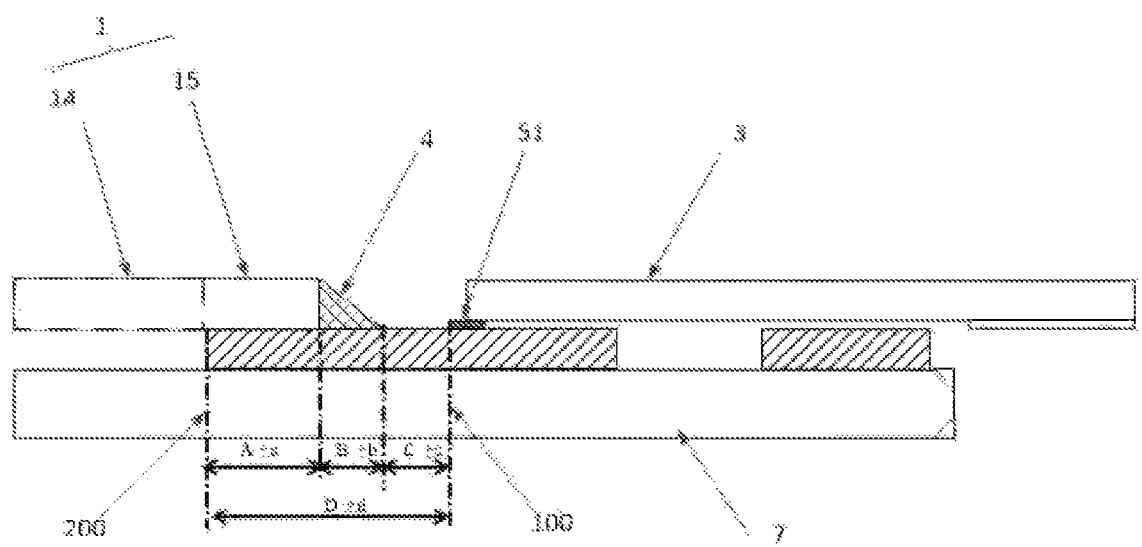
FIG. 4 is another schematic view of the display device according to one embodiment of the present disclosure.

In order to prevent the light leakage at the side wall of the display panel in the functional module setting region and improve the attachment accuracy of the protective film of the functional module setting region of the cover plate, the present disclosure provides in some embodiments a display module, which, as shown in FIGS. 2 to 4, includes a display panel 1 and a cover plate 7 covering a light-exiting surface of the display panel 1. The cover plate includes a display panel setting region and a functional module setting region, and a light shielding structure 4 is connected to a side wall of the display panel close to the functional module setting region. The functional module setting region includes a light shielding region 71 and a light transmitting region 72 for exposing a functional module 10, and the light shielding region 71 surrounds the light transmitting region 72. The light shielding region 71 is provided with an alignment mark 5 for the attachment of a protective film 3 for covering the light transmitting region 72.

The light shielding structure 4 may be circumferentially connected to the side wall of the display panel close to the functional module setting region. The light shielding structure 4 may be arranged in a consecutive manner, that is, the side wall of the display panel close to the functional module setting region may be completely shielded by the light shielding structure 4, so as to effectively prevent the occurrence of the light leakage.

Through the alignment mark 5, it is able to define an attachment position of the protective film 3 and improve the attachment accuracy of the protective film 3. During the attachment, position information about the alignment mark 5 may be acquired through an image acquisition structure (such as a Charge Coupled Device (CCD) camera), so as to facilitate the attachment of the protective film 3. Subsequent to the attachment, image information about the alignment mark 5 may also be acquired through the image acquisition structure to detect the attachment quality of the protective film 3. The protective film 3 needs to be peeled off. In order to avoid the other components from being adversely affected when the protective film 3 is being peeled off, the protective film 3 may partially cover the alignment mark 5. An image of the alignment mark 5 may be acquired at a side of the protective film 3 away from the alignment mark 5 through the image acquisition structure. Upon the acquisition of a clear image of at least a part of the alignment mark 5, it means that the protective film 3 has been attached at a proper position. When the image of the alignment mark 5 fails to be acquired, it means that the protective film 3 has been attached at an offset position.

The light shielding structure 4 may be of various structures, as long as the light leakage may be prevented at the side wall of the display panel close to the functional module setting region. In the embodiments of the present disclosure, the light shielding structure 4 may be a light shielding adhesive formed through dispensing.

In order to effectively prevent the occurrence of the light leakage at the side wall of the display panel close to the functional module setting region 3, in the embodiments of the present disclosure, a thickness of the light shielding adhesive in a direction perpendicular to the display panel 1 may be greater than or equal to a thickness of the display panel 1. That is, the side wall of the display panel close to the functional module setting region may be completely covered by the light shielding adhesive, so as to prevent the occurrence of the light leakage at the side wall of the display panel close to the functional module setting region.

In a possible embodiment of the present disclosure, the thickness of the light shielding adhesive in the direction perpendicular to the display panel 1 may be, but not limited to, 0.3 mm to 0.6 mm, i.e., the thickness of the light shielding adhesive may be set according to the practical need.

In another possible embodiment of the present disclosure, the thickness of the light shielding adhesive in the direction perpendicular to the display panel 1 may be equal to the thickness of the display panel 1, so as to prevent the light shielding adhesive from interfering with the arrangement of the other components.

In the embodiments of the present disclosure, the light shielding adhesive may be, but not limited to, an Ultraviolet (UV)—curable adhesive.

In the embodiments of the present disclosure, the functional module setting region may be divided by the alignment mark 5 into a light shielding adhesive setting region and a protective film 3 attaching region, and the light shielding adhesive setting region may surround the protective film 3 attachment region.

Through the alignment mark 5, it is also able to prevent the light shielding adhesive from being connected to the protective film 3 due to the overflowing of the light shielding adhesive, thereby to, thereby to improve the connection stability of the light shielding adhesive when the protective film 3 is being peeled off, and improve a light shielding effect of the light shielding adhesive.

In a possible embodiment of the present disclosure, the alignment mark 5 is configured to detect a setting position of the light shielding adhesive. For example, an image of the alignment mark 5 may be acquired through an image acquisition structure (such as a CCD camera). When the light shielding adhesive overflows to cover the alignment mark 5, it is impossible to acquire a complete image of the alignment mark 5. At this time, a setting position range of the light shielding adhesive may be determined to prevent the light shielding adhesive from being adversely affected when the protective film is being peeled off.

The alignment mark 5 may be of various structures. In a possible embodiment of the present disclosure, the side wall of the display panel close to the functional module setting region may include a first side wall 11, a second side wall 12 and a third side wall 13. The first side wall 11 and the third side wall 13 may be arranged opposite to each other, the second side wall 12 may be arranged between the first side wall 11 and the third side wall 13, a notch defined the first side wall 11, the second side wall 12 and the third side wall 13 may be arranged in such a manner as to directly face the functional module setting region. The alignment mark 5 may include three alignment sub-marks (a first alignment sub-mark 51, a second alignment sub-mark 52, a third alignment sub-mark 53) corresponding to the first side wall 11, the second side wall 12 and the third side wall 13 respectively, and the three alignment sub-marks may be spaced apart from each other, as shown in FIG. 2.

It should be appreciated that, the quantity of the alignment sub-marks may be set according to the practical need.

In a possible embodiment of the present disclosure, the three alignment sub-marks may also be formed as a consecutive one, which will not be particularly defined herein.

Because the alignment mark 5 is arranged at a backlight side of the display panel 1, it is unnecessary to remove it separately. However, in order to avoid the other components from being adversely affected by the alignment mark 5, it would be better to provide the alignment mark 5 with a smaller thickness, e.g., a dozen of microns, in the direction perpendicular to the display panel 1, and may be in the tens of microns.

In the embodiments of the present disclosure, the display panel 1 may include an active display region 14 and a non-display region 15, the light shielding region 71 may include a first light shielding region 701 extending toward the display panel 1, and an orthogonal projection of the first light shielding region 701 onto the display panel 1 may cover the non-display region.

Through the first light shielding region 701, I tis able to prevent the occurrence of the light leakage in the direction perpendicular to the display panel.

In the embodiments of the present disclosure, each alignment sub-mark may include a first edge 100 close to a corresponding side wall of the display panel, and the first light shielding region 701 may include a second edge 200 away from the first edge 100 in the first direction. Taking the first alignment sub-mark 51 and the corresponding first side wall 11 as an example, as shown in FIG. 4, a distance D between the first edge 100 and the second edge 200 may be calculated through the following formulae: $c=\pm\sqrt{a^2+b^2+d^2}$ (acquired using a combined tolerance), $D=A+B+C$, and $C \geq c$, where A is a length of the first light shielding region 701 in the first direction, B is a width of the light shielding structure 4 in the first direction, C is a distance between the light shielding structure 4 and a corresponding alignment sub-mark in the first direction, a is a tolerance of A, b is a tolerance of B, c is a tolerance of C, and d is a tolerance of D.

The first direction may be a direction from the alignment sub-mark to the corresponding side wall of the display panel. Referring to FIG. 2, for the first alignment sub-mark 51 and the corresponding first side wall 11, the first direction may be a direction X in FIG. 2; for the second alignment sub-mark 52 and the corresponding second side wall 12, the first direction may be a direction Y in FIG. 2; and for the third alignment sub-mark 53 and the corresponding third side wall 13, the first direction may be a direction opposite to the direction X in FIG. 2.

It should be appreciated that, the formula $c=\pm\sqrt{a^2+b^2+d^2}$ is a conventional way to calculate the combined tolerance, which will not be particularly defined herein. In the embodiments of the present disclosure, the setting position of the alignment mark may be acquired using an acquisition method of the combined tolerance, so as to increase the accuracy, prevent the light shielding adhesive from being connected to the protective film 3, and prevent the light shielding adhesive from being curled up when the protective film 3 is being peeled off.

In the embodiments of the present disclosure, the light shielding region 71 may be provided with a black ink layer.

In the embodiments of the present disclosure, the alignment mark 5 may be a colored ink layer in a first color, and the first color may be a color other than black.

The first color may be white, red, etc., as long as it may be distinguished from the black ink layer to facilitate the acquisition of the image through the image acquisition structure.

In the embodiments of the present disclosure, the display module may further include a buffer layer 6 arranged at the backlight side of the display panel 1.

Through the buffer layer 6, it is able to protect the display panel 1, and in the case of an impact, e.g., a collision, it is able to alleviate an impact force applied to the display panel 1. The buffer layer 6 may be made of, but not limited to, foam.

The buffer layer 6 may be arranged at the backlight side of the display panel 1, and an area of an orthogonal projection of the buffer layer 6 onto the display panel 1 may be smaller than an area of the display panel 1 (there is a relatively small a difference between the area of the orthogonal projection of the buffer layer 6 onto the display panel 1 and the area of the display panel 1), so as to avoid interference. At this time, in order to effectively prevent the occurrence of the light leakage at the side wall of the display panel close to the functional module setting region, the light shielding adhesive may cover a portion of the display panel 1 outside the buffer layer 6.

The buffer layer 6 may be connected to the backlight side of the display panel through an adhesive layer, and the adhesive layer may be an optically clear adhesive.

In a possible embodiment of the present disclosure, a heat dissipation layer may also be arranged between the buffer layer 6 and the display panel 1 to facilitate the heat dissipation of the display panel 1.

The present disclosure further provides in some embodiments a display device including the above-mentioned display module.

The display device may be any product or member having a display function, such as LCD television, LCD display, digital photo frame, mobile phone or tablet computer.

The functional module may include a camera, an infrared sensor, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display module, comprising a display panel and a cover plate covering a light-exiting surface of the display panel, wherein the cover plate comprises a display panel setting region and a functional module setting region, a light shielding structure is connected to a side wall of the display panel close to the functional module setting region, the functional module setting region comprises a light shielding region and a light transmitting region for exposing a functional module, the light shielding region surrounds the light transmitting region, and the light shielding region is provided with an alignment mark for the attachment of a protective film for covering the light transmitting region, wherein the light shielding structure is a light shielding adhesive, wherein the functional module setting region is divided by the alignment mark into a light shielding adhesive setting region and a protective film attaching region, and the light shielding adhesive setting region surrounds the protective film attaching region.

2. The display module according to claim 1, wherein a thickness of the light shielding adhesive in a direction perpendicular to the display panel is greater than or equal to a thickness of the display panel.

3. The display module according to claim 1, wherein the side wall of the display panel close to the functional module setting region comprises a first side wall, a second side wall and a third side wall, the first side wall and the third side wall are arranged opposite to each other, the second side wall is connected between the first side wall and the third side wall, the alignment mark comprises three alignment sub-marks alignment sub- mark corresponding to the first side wall, the second side wall and the third side wall respectively, and the three alignment sub-marks are spaced apart from each other.

4. The display module according to claim 3, wherein the display panel comprises an active display region and a non-display region, the light shielding region comprises a first light shielding region extending toward the display panel, and an orthogonal projection of the first light shielding region onto the display panel covers the non-display region.

5. The display module according to claim 4, wherein each alignment sub-mark comprises a first edge close to a corresponding side wall of the display panel, the first light shielding region comprises a second edge away from the first edge in a first direction, and a distance D between the first edge and the second edge is calculated through the following formulae: $c=\pm\sqrt{a^2+b^2+d^2}$, $D=A+B+C$, and $C \geq c$, where A is a length of the first shielding region in the first direction, B is a width of the light shielding structure in the first direction, C is a distance between the light shielding structure and a corresponding alignment sub-mark in the first direction, a is a tolerance of A, b is a tolerance of B, c is a tolerance of C, and d is a tolerance of D, wherein the first direction is a direction from the alignment sub-mark to the corresponding side wall of the display panel.

6. The display module according to claim 1, wherein the light shielding region is provided with a black ink layer.

7. The display module according to claim 6, wherein the alignment mark is a colored ink layer in a first color, and the first color is a color other than black.

8. A display device, comprising the display substrate according to claim 1.

9. A display module, comprising a display panel and a cover plate covering a light-exiting surface of the display panel, wherein the cover plate comprises a display panel setting region and a functional module setting region, a light shielding structure is connected to a side wall of the display panel close to the functional module setting region, the functional module setting region comprises a light shielding region and a light transmitting region for exposing a functional module, the light shielding region surrounds the light transmitting region, and the light shielding region is provided with an alignment mark for the attachment of a protective film for covering the light transmitting region, wherein the light shielding structure is a light shielding adhesive, wherein the side wall of the display panel close to the functional module setting region comprises a first side wall, a second side wall and a third side wall, the first side wall and the third side wall are arranged opposite to each other, the second side wall is connected between the first side wall and the third side wall, the alignment mark comprises three alignment sub-marks alignment sub-mark corresponding to the first side wall, the second side wall and the third side wall respectively, and the three alignment sub-marks are spaced apart from each other.

10. The display module according to claim 9, wherein the display panel comprises an active display region and a non-display region, the light shielding region comprises a first light shielding region extending toward the display panel, and an orthogonal projection of the first light shielding region onto the display panel covers the non-display region.

11. The display module according to claim 10, wherein each alignment sub-mark comprises a first edge close to a corresponding side wall of the display panel, the first light shielding region comprises a second edge away from the first edge in a first direction, and a distance D between the first edge and the second edge is calculated through the following formulae: $c=\pm\sqrt{a^2+b^2+d^2}$, $D=A+B+C$, and $C \geq c$, where A is a length of the first shielding region in the first direction, B is a width of the light shielding structure in the first direction, C is a distance between the light shielding structure and a corresponding alignment sub-mark in the first direction, a is a tolerance of A, b is a tolerance of B, c is a tolerance of C, and d is a tolerance of D, wherein the first direction is a direction from the alignment sub-mark to the corresponding side wall of the display panel.

12. A display module, comprising a display panel and a cover plate covering a light-exiting surface of the display panel, wherein the cover plate comprises a display panel setting region and a functional module setting region, a light shielding structure is connected to a side wall of the display panel close to the functional module setting region, the functional module setting region comprises a light shielding region and a light transmitting region for exposing a functional module, the light shielding region surrounds the light transmitting region, and the light shielding region is provided with an alignment mark for the attachment of a protective film for covering the light transmitting region,
   wherein the light shielding region is provided with a black ink layer,
   wherein the alignment mark is a colored ink layer in a first color, and the first color is a color other than black.

\* \* \* \* \*